United States Patent
Liu et al.

(10) Patent No.: US 12,223,654 B1
(45) Date of Patent: Feb. 11, 2025

(54) IMPLEMENTING IMAGE MODIFICATION FUNCTIONS USING VARIABLE SCANNING ORDERS

(71) Applicant: META PLATFORMS, INC., Menlo Park, CA (US)

(72) Inventors: Chien Cheng Liu, San Jose, CA (US); Cheng-Chiang Chen, San Jose, CA (US); Yunqing Chen, Los Altos, CA (US)

(73) Assignee: META PLATFORMS, INC., Menlo Park, CA (US)

( * ) Notice: Subject to any disclaimer, the term of this patent is extended or adjusted under 35 U.S.C. 154(b) by 367 days.

(21) Appl. No.: 17/381,109

(22) Filed: Jul. 20, 2021

(51) Int. Cl.
  *G06T 7/11* (2017.01)
  *G06T 3/60* (2006.01)

(52) U.S. Cl.
  CPC .......... *G06T 7/11* (2017.01); *G06T 3/60* (2013.01); *G06T 2207/20021* (2013.01); *G06T 2207/20132* (2013.01)

(58) Field of Classification Search
  CPC ... G06T 7/11; G06T 3/60; G06T 2207/20021; G06T 2207/20132
  See application file for complete search history.

(56) References Cited

U.S. PATENT DOCUMENTS

| | | | |
|---|---|---|---|
| 7,636,497 B1 * | 12/2009 | Chambers | H04N 5/2628 382/277 |
| 8,406,297 B2 | 3/2013 | Lu et al. | |
| 8,515,194 B2 | 8/2013 | Srinivasan et al. | |
| 9,888,247 B2 | 2/2018 | Rintaluoma et al. | |
| 2001/0043758 A1 * | 11/2001 | Yamaguchi | H04N 1/3877 382/297 |
| 2008/0143749 A1 * | 6/2008 | Weybrew | G06T 3/60 345/649 |
| 2010/0104221 A1 * | 4/2010 | Yeung | G06T 3/60 382/297 |
| 2010/0232504 A1 | 9/2010 | Feng | |
| 2010/0254617 A1 * | 10/2010 | Hwang | G06T 3/602 382/296 |
| 2011/0206275 A1 * | 8/2011 | Takahashi | G06T 7/74 382/159 |
| 2013/0027584 A1 * | 1/2013 | Zerwick | H04N 1/41 348/222.1 |
| 2013/0135351 A1 * | 5/2013 | Tripathi | G09G 5/393 345/649 |
| 2016/0073113 A1 * | 3/2016 | Rintaluoma | H04N 19/15 375/240.12 |

(Continued)

*Primary Examiner* — Xuemei G Chen
(74) *Attorney, Agent, or Firm* — Mannava & Kang, P.C.

(57) ABSTRACT

According to examples, a system for implementing image modification functions via use of variable scanning orders is described. The system may include a processor and a memory storing instructions. The processor, when executing the instructions, may cause the system to partition an image into a plurality of image blocks, identify one or more image blocks of the plurality of image blocks associated with a region of interest (ROI), and scan the one or more image blocks in an image modification order. The processor, when executing the instructions, may then arrange the one or more image blocks according to the image modification order to form a modified image including the region of interest (ROI) and crop the region of interest (ROI) in the modified image to form a new image.

20 Claims, 13 Drawing Sheets

(56) References Cited

U.S. PATENT DOCUMENTS

2016/0275650 A1* 9/2016 Case .................. G06T 3/606
2017/0372452 A1* 12/2017 Wang .................. G06T 3/60
2018/0146158 A1* 5/2018 Bogusz ............... H04N 5/2628
2021/0375361 A1* 12/2021 Seiler .................. G06T 19/006

* cited by examiner

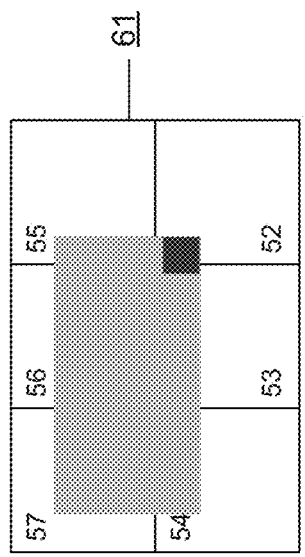
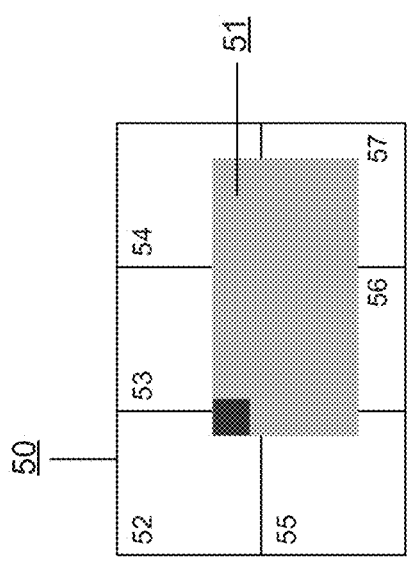
FIG. 7

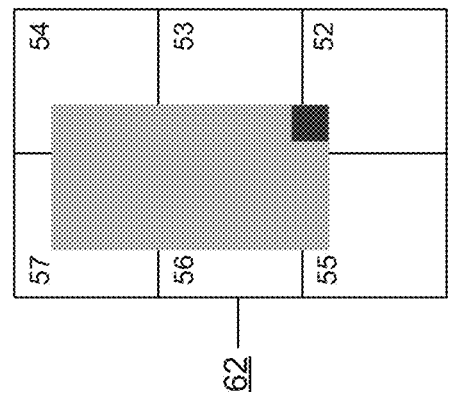
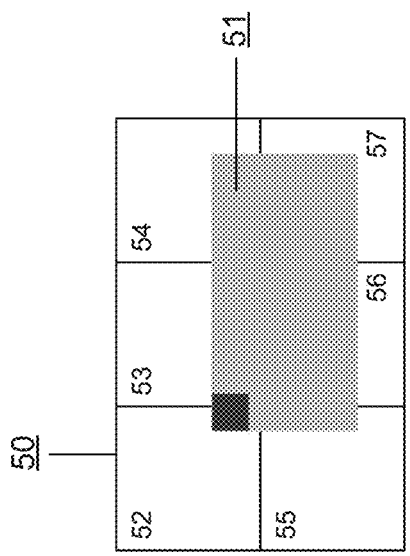
FIG. 8

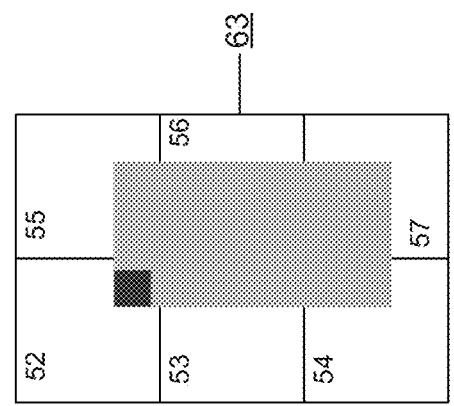
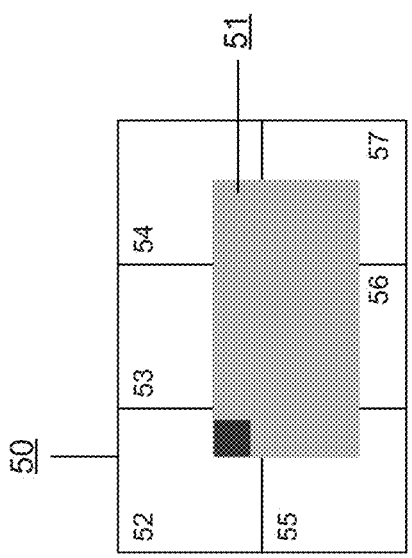
FIG. 9

IMPLEMENTING IMAGE MODIFICATION FUNCTIONS USING VARIABLE SCANNING ORDERS

TECHNICAL FIELD

This patent application relates generally to digital content creation, management, use, and distribution, and more specifically, to systems and methods for implementing image modification functions via use of variable scanning orders.

BACKGROUND

With recent advances in technology, prevalence and proliferation of content creation and delivery has increased greatly in recent years. Users are consuming a variety of content types, including text, audio, video and image content.

Image content may be particularly appealing to consuming users. One reason may be its ease of use, in that it may typically require less storage space than other content forms (e.g., audio, video). Another reason may be user desire to manipulate an image to create another. Reappropriation of images and modifying them to create a "meme," "fan art," or other associated content has become a popular practice.

Examples of modification functions commonly performed by users may include cropping, rotating, and flipping. In some cases, users may wish to perform more than one of these in the same case. However, performing multiple modification functions may be difficult, as adjustments made during each modification may often affect a subsequent modification or action.

BRIEF DESCRIPTION OF DRAWINGS

Features of the present disclosure are illustrated by way of example and not limited in the following figures, in which like numerals indicate like elements. One skilled in the art will readily recognize from the following that alternative examples of the structures and methods illustrated in the figures can be employed without departing from the principles described herein.

FIG. 7 illustrates a first example of a dual function image modification.

FIG. 8 illustrates a second example of a dual function image modification.

FIG. 9 illustrates a third example of a dual function image modification.

DETAILED DESCRIPTION

Figure 1:
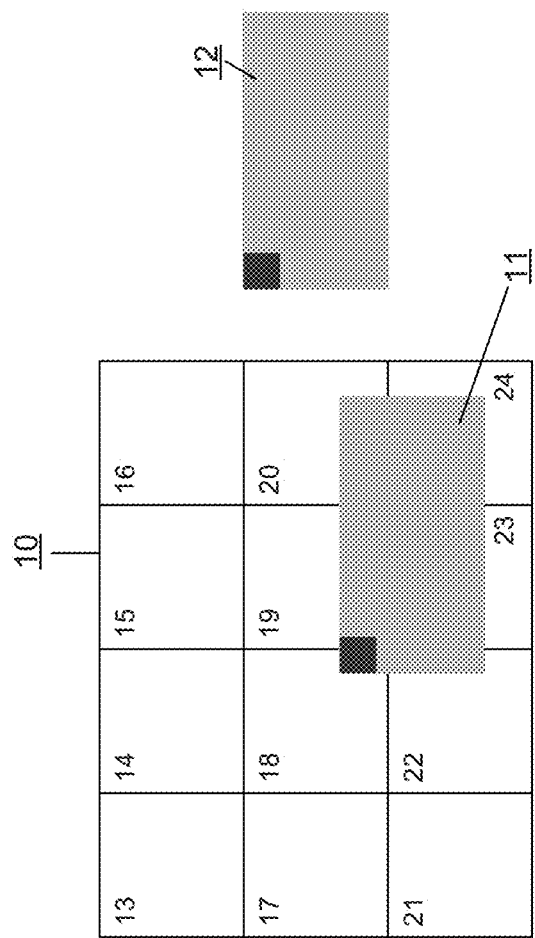
FIG. 1 illustrates an example of an image including a region of interest (ROI) and a plurality of image blocks.

For simplicity and illustrative purposes, the present application is described by referring mainly to examples thereof. In the following description, numerous specific details are set forth in order to provide a thorough understanding of the present application. It will be readily apparent, however, that the present application may be practiced without limitation to these specific details. In other instances, some methods and structures readily understood by one of ordinary skill in the art have not been described in detail so as not to unnecessarily obscure the present application. As used herein, the terms "a" and "an" are intended to denote at least one of a particular element, the term "includes" means includes but not limited to, the term "including" means including but not limited to, and the term "based on" means based at least in part on.

With recent advances in technology, prevalence and proliferation of content creation and delivery has increased greatly in recent years. Users are consuming a variety of content types, including text, audio, video and image content.

Image content may be particularly appealing to consuming users. One reason may be its ease of use, in that it may require less storage space than other content forms (e.g., audio, video).

Another reason may relate to user desire to manipulate images and create new content. In particular, reappropriation of an image and modifying it to create a "meme", "fan art" or other content has become a popular practice.

Users may seek to perform various types of image modification functions to generate new images. Examples of these image modification functions may include rotation, flipping and cropping.

Rotation may include manipulation of an orientation of an image. In some examples, an image rotation may be indicated by a plane angle, in which one full rotation may be 360 degrees (i.e., 360°). So, in one example, an image may be rotated by 90 degrees (i.e., 90°). In another example, the image may be rotated by 270 degrees (i.e., 270°).

Horizontal flipping may include instances where an image may be "flipped" (i.e., turned) along a vertical axis. Typically, the vertical axis around which the image may be flipped may be located in a (horizontal) center of the image.

Vertical flipping may include instances where an image may be "flipped" (i.e., turned) along a horizontal axis. Typically, the horizontal axis around which the image may be flipped may be located in a (vertical) center of the image.

Cropping may include instances where an image may be changed from an original (i.e., existing) digital frame size to any reduced and desired frame size. In some instances, cropping the image may include selecting a portion of the (original) image. That is, an image may typically be cropped along a "region of interest" (ROI), wherein the region of interest (ROI) may often include one or more features of interest. So, in one example, the region of interest (ROI)

may include an area of the image including a person's face and upper body (i.e., the feature of interest) along with surrounding areas.

In some examples and as discussed further below, cropping a region of interest (ROI) may include identifying, extracting and arranging image blocks associated with the region of interest (ROI). In some examples (and as discussed further below), to crop an original image, processing may take place for each image block and its immediate neighbor to the right.

In some examples, to crop a region of interest (ROI), an image processing technique may include partitioning an original image into a plurality of M×M image blocks, which may be overlaid over the original image. In some examples, M may be an integer number of image pixels. Also, in some instances, M may be a smallest unit of pixels used in partitioning of the original image.

In some examples, to crop a region of interest (ROI), an image processing technique that may be utilized may be use of "memory tiles" (also be referred to as "access units"). In an instance where an image may have been divided into a plurality of M×M image blocks, each of the plurality of M×M image blocks may be divided into one or more P×Q memory tiles. In some examples, M may be the larger of P and Q. In some examples, wherein P and Q may be an integer number of image pixels. So, in one example, P may be 64 and Q may be 8, and wherein the associated memory may constitute 512 (i.e., 64×8) pixels. It should be appreciated that it may not be necessary that P be an integer multiple of Q, or that P be greater or less than Q.

An example of an image 10 including a region of interest (ROI) 11 with a plurality of image blocks 13-24 is illustrated in FIG. 1. In this example, the region of interest (ROI) 11 may be located inside of the image blocks 18-20 and 22-24. In this example, the image blocks 18-20 and 22-24 may be cropped to form a new image 12. It should be appreciated that in order to crop the region of interest (ROI), the remaining image blocks 13-16, 17 and 21 may not require any processing at all, and may be excluded.

In some examples, to crop a region of interest (ROI), an image processing technique that may be utilized may be processing the associated image blocks in raster-scan order. In some examples, raster-scan order may include any processing order that may progressively and systematically (e.g., line-by-line) cover one target area at a time.

In some examples, when processing an image block, horizontal misalignment may require processing of neighbor block to an immediate right. So, in an example where processing of a region of interest (ROI) may take place for each image block and its immediate neighbor to the right (i.e., where a memory tile or access unit may need information from a current image block and its immediate neighbor to the right), processing may include partitioning each image block into one or more memory tiles and progressively extracting (e.g., line-by-line from top to bottom) and outputting each memory tile. Upon completion of processing of a row of image blocks, the processing may continue to a first image block of the next row down (and its neighbor) until a last row may be reached. Upon extracting each of the image blocks associated with the region of interest (ROI), the extracted portions may be combined to generate a new image.

In some instances, wherein a remaining portion of an image block may be reached, the remaining portion of an image block may not be sufficient to cover an entirety of a memory tile. So, in an example employing 64×8 memory tiles, if a bottom of an image block may be reached where eight (8) lines of a memory tile may not be sufficient, the remaining portion may be processed with image blocks in a next row (i.e., below). That is, if lines of a remaining portion at the bottom of an image block may be fewer than 8 lines, they may be stored temporarily in a line buffer and may be merged with first lines of image blocks in the next image block row to form a complete output of memory tiles. In some examples, upon reaching a last block of memory tiles (i.e., a last row), any remaining portion(s) may not require use of a line buffer and instead may be processed and extracted directly.

Figure 2:
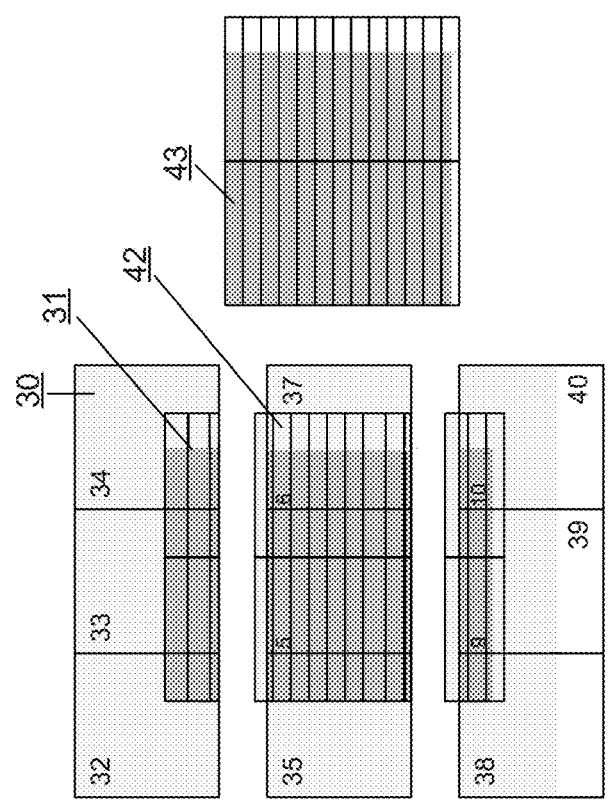
FIG. 2 illustrates an example of an image including a region of interest (ROI), a plurality of image blocks and a plurality of memory tiles.

An example of an image 30 including a region of interest (ROI) 31, a plurality of image blocks 32-40 and a plurality of memory tiles 42 is illustrated in FIG. 2. In FIG. 2, the plurality of image blocks 32-40 may be overlaid over the image 30 and a region of interest (ROI) 31. Moreover, the plurality of memory tiles 42 may be utilized to crop the region of interest (ROI) 31 to form a new image 43.

In some instances, users may desire to perform more than one of the above-mentioned image modification functions (e.g., cropping, rotating, flipping, etc.) at once. By way of example, it may often be typical for users to crop a region of interest (ROI) and optionally apply one or more of rotation, horizontal flipping and/or vertical flipping.

However, it should be appreciated that performing more than one of the above-mentioned image modification functions may be difficult. In some instances, operations performed during a first modification function may affect a following modification. For example, in some instances, utilizing a particular memory tile arrangement to rotate image blocks associated with a region of interest (ROI) may present difficulties (i.e., inefficiencies) when cropping the (same) region of interest (ROI). More particularly, in some examples, an adjustment that may be made to maintain locational pixel integrity during a rotation may (negatively) affect a following cropping operation.

Systems and methods for providing image modification functions utilizing variable scanning orders are described. In particular, the systems and methods may provide functions to modify an image via rotation, horizontal flipping and vertical flipping via use of particular scanning methods. Upon modification of the image via a particular scanning method, a modified image may be cropped to create a new image. Accordingly, the systems and methods described may enable alterations to existing images and generation of new images via implementation of one or more sequential scanning orders with limited use of processing resources.

Figure 3A:
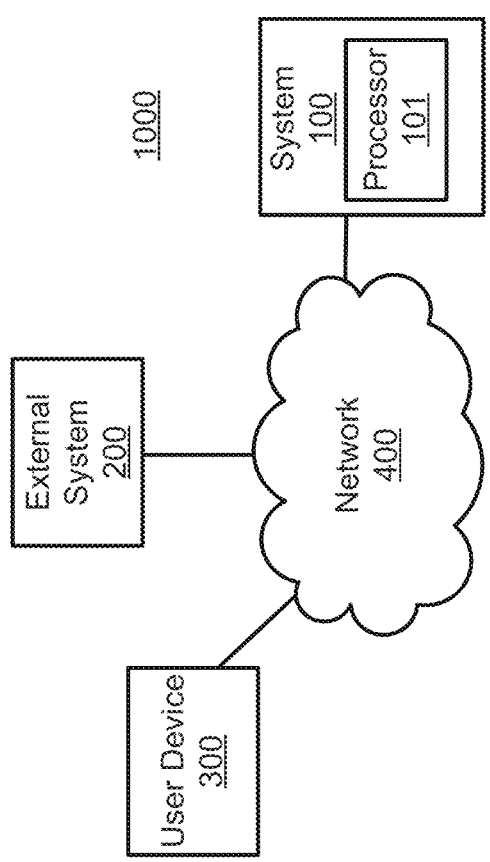
FIG. 3A illustrates a block diagram of a system environment, including a system, that may implement image modification functions via use of variable scanning orders, according to an example.
Figure 3B:
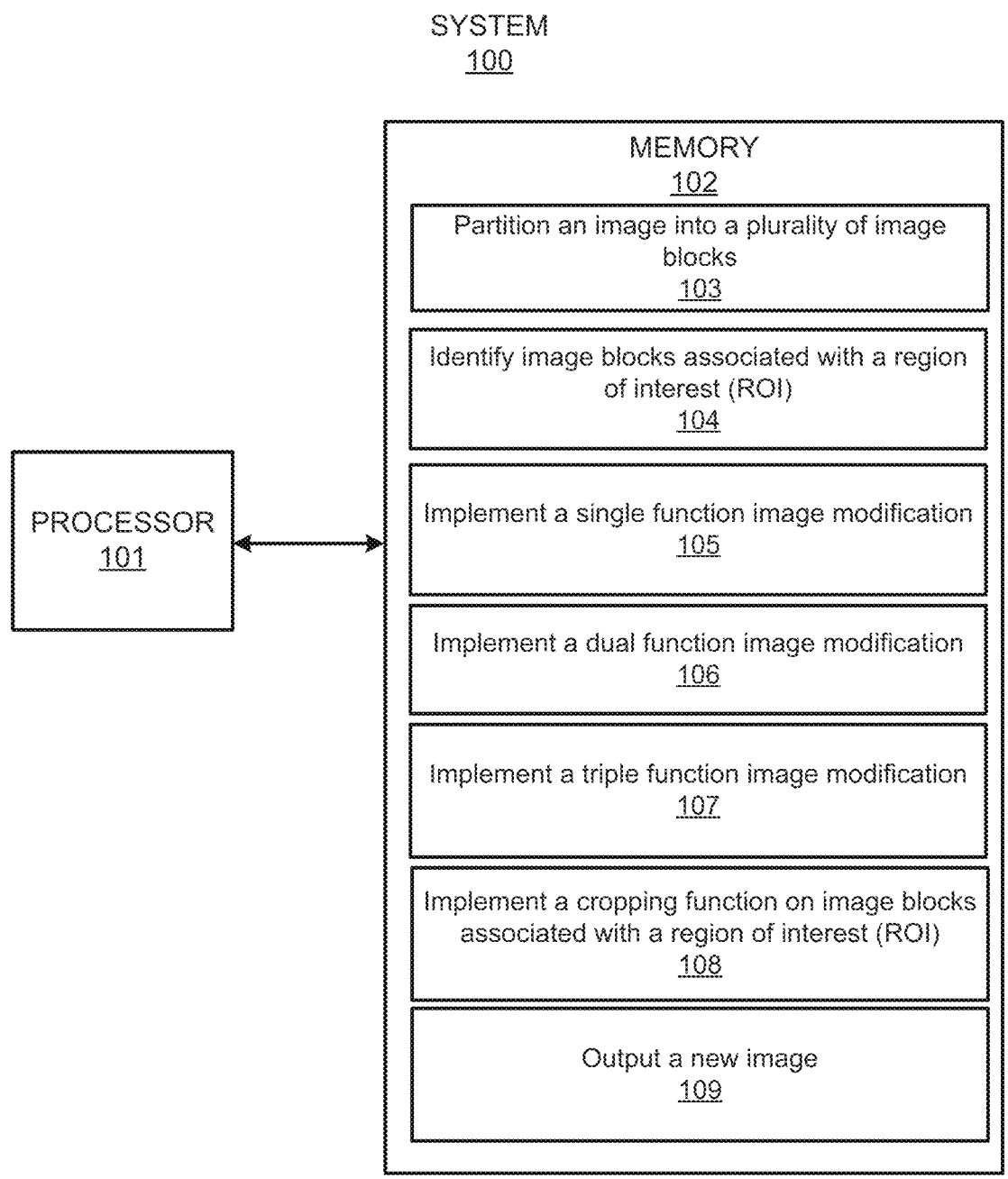
FIG. 3B illustrates a block diagram of the system that may implement image modification functions via use of variable scanning orders, according to an example.

Reference is now made to FIGS. 3A-B. FIG. 3A illustrates a block diagram of a system environment, including a system, that may be implemented to provide image modification functions via use of variable scanning orders, according to an example. FIG. 3B illustrates a block diagram of the system that may be implemented to provide image modification functions via use of variable scanning orders, according to an example.

As will be described in the examples below, one or more of system 100, external system 200, user device 300 and system environment 1000 shown in FIGS. 3A-B may be operated by a service provider to provide image modification functions via use of variable scanning orders. It should be appreciated that one or more of the system 100, the external system 200, the user device 300 and the system environment 1000 depicted in FIGS. 3A-B may be provided as examples. Thus, one or more of the system 100, the external system 200 the user device 300 and the system environment 1000 may or may not include additional features and some of the features described herein may be removed and/or modified without departing from the scopes of the system 100, the external system 200, the user device 300 and the system environment 1000 outlined herein. Moreover, in some examples, the system 100, the external system 200, and/or the user device 300 may be or associated with a social networking system, a content sharing network, an advertisement system, an online system, and/or any other system that facilitates any variety of digital content in personal, social, commercial, financial, and/or enterprise environments.

While the servers, systems, subsystems, and/or other computing devices shown in FIGS. 3A-B may be shown as single components or elements, it should be appreciated that one of ordinary skill in the art would recognize that these single components or elements may represent multiple components or elements, and that these components or elements may be connected via one or more networks. Also, middleware (not shown) may be included with any of the elements or components described herein. The middleware may include software hosted by one or more servers. Furthermore, it should be appreciated that some of the middleware or servers may or may not be needed to achieve functionality. Other types of servers, middleware, systems, platforms, and applications not shown may also be provided at the front-end or back-end to facilitate the features and functionalities of the system 100, the external system 200, the user device 300 or the system environment 1000.

It should also be appreciated that the systems and methods described herein may be particularly suited for digital content, but are also applicable to a host of other distributed content or media. These may include, for example, content or media associated with data management platforms, search or recommendation engines, social media, and/or data communications involving communication of potentially personal, private, or sensitive data or information. These and other benefits will be apparent in the descriptions provided herein.

In some examples, the external system 200 may include any number of servers, hosts, systems, and/or databases that store data to be accessed by the system 100, the user device 300, and/or other network elements (not shown) in the system environment 1000. In addition, in some examples, the servers, hosts, systems, and/or databases of the external system 200 may include one or more storage mediums storing any data. In some examples, and as will be discussed further below, the external system 200 may be utilized to store any information (e.g., usernames, passwords, etc.) that may relate to generation and delivery of content. As will be discussed further below, in other examples, the external system 200 may be utilized by a service provider distributing content (e.g., a social media application provider) to implementing image modification functions via use of variable scanning orders.

In some examples, and as will be described in further detail below, the user device 300 may be utilized to, among other things, browse content such as content provided by a content platform (e.g., a social media platform). More particularly, the user device 300 may be configured to modify existing images and generate new images via use of image modification functions implementing variable scanning orders, as described herein. In some examples, the user device 300 may be electronic or computing devices configured to transmit and/or receive data. In this regard, each of the user device 300 may be any device having computer functionality, such as a television, a radio, a smartphone, a tablet, a laptop, a watch, a desktop, a server, or other computing or entertainment device or appliance.

In some examples, the user device 300 may be mobile devices that may be communicatively coupled to the network 400 and enabled to interact with various network elements over the network 400. In some examples, the user device 300 may execute an application allowing a user of the user device 300 to interact with various network elements on the network 400. Additionally, the user device 300 may execute a browser or application to enable interaction between the user device 300 and the system 100 via the network 400. In some examples, and as will described further below, a client may utilize the user device 300 to crop, rotate and/or flip an image provided by a content provider. Moreover, in some examples and as will also be discussed further below, the user device 300 may enable a user to employ image modification functions via use of variable scanning orders as described herein. In some examples, information relating to the user may be stored and transmitted by the user device 300 to other devices, such as the external system 200.

The system environment 1000 may also include the network 400. In operation, one or more of the system 100, the external system 200 and the user device 300 may communicate with one or more of the other devices via the network 400. The network 400 may be a local area network (LAN), a wide area network (WAN), the Internet, a cellular network, a cable network, a satellite network, or other network that facilitates communication between, the system 100, the external system 200, the user device 300 and/or any other system, component, or device connected to the network 400. The network 400 may further include one, or any number, of the exemplary types of networks mentioned above operating as a stand-alone network or in cooperation with each other. For example, the network 400 may utilize one or more protocols of one or more clients or servers to which they are communicatively coupled. The network 400 may facilitate transmission of data according to a transmission protocol of any of the devices and/or systems in the network 400. Although the network 400 is depicted as a single network in the system environment 1000 of FIG. 3A, it should be appreciated that, in some examples, the network 400 may include a plurality of interconnected networks as well.

It should be appreciated that in some examples, and as will be discussed further below, the system 100 may be configured to utilize various techniques and mechanisms to provide image modification functions via use of variable scanning orders. Details of the system 100 and its operation within the system environment 1000 will be described in more detail below.

As shown in FIGS. 3A-B, the system 100 may include processor 101, a graphics processor unit (GPU) 101*a*, and the memory 102. In some examples, the processor 101 may be configured to execute the machine-readable instructions stored in the memory 102. It should be appreciated that the processor 101 may be a semiconductor-based microprocessor, a central processing unit (CPU), an application specific integrated circuit (ASIC), a field-programmable gate array (FPGA), and/or other suitable hardware device.

In some examples, the memory 102 may have stored thereon machine-readable instructions (which may also be termed computer-readable instructions) that the processor 101 may execute. The memory 102 may be an electronic, magnetic, optical, or other physical storage device that contains or stores executable instructions. The memory 102 may be, for example, Random Access memory (RAM), an Electrically Erasable Programmable Read-Only Memory (EEPROM), a storage device, an optical disc, or the like.

The memory 102, which may also be referred to as a computer-readable storage medium, may be a non-transitory machine-readable storage medium, where the term "non-transitory" does not encompass transitory propagating signals. It should be appreciated that the memory 102 depicted in FIGS. 3A-B may be provided as an example. Thus, the memory 102 may or may not include additional features, and some of the features described herein may be removed and/or modified without departing from the scope of the memory 102 outlined herein.

It should be appreciated that, and as described further below, the processing performed via the instructions on the memory 102 may or may not be performed, in part or in total, with the aid of other information and data, such as information and data provided by the external system 200 and/or the user device 300. Moreover, and as described further below, it should be appreciated that the processing performed via the instructions on the memory 102 may or may not be performed, in part or in total, with the aid of or in addition to processing provided by other devices, including for example, the external system 200 and/or the user device 300.

It should be appreciated that, in some examples, a memory may require two MxM buffers to perform the rotating, horizontal flipping, vertical flipping and cropping operations described herein (and further below). Furthermore, in some examples, a memory may require three MxM buffers for "high performance", wherein the first buffer and the second buffer may be directed to processing and the third buffer may be used for loading (i.e., pre-fetching) and preparing (i.e., pre-processing) purposes. In some examples, the first buffer and the second buffer may be utilized to address mis-alignment during cropping.

Moreover, it should be appreciated and as discussed further below, in some examples, that various angular rotations (e.g., 90 degree (90°), 180 degree (180°) and 270 degree (270°) in clockwise or counterclockwise directions may be achieved using a combination of two or more of 90-degree clockwise rotation, horizontal flipping and vertical flipping. So, in one example, a 180 degree (180°) clockwise rotation may be achieved via a horizontal flipping followed by a vertical flipping.

In some examples, the memory 102 may store instructions, which when executed by the processor 101, may cause the processor to: partition 103 an image into a plurality of image blocks; identify 104 image blocks associated with a region of interest (ROI); implement 105 a single function image modification on image blocks associated with the region of interest (ROI); implement 106 a dual function image modification on image blocks associated with the region of interest (ROI); implement 107 a triple function image modification on image blocks associated with the region of interest (ROI); implement 108 a cropping function on image blocks associated with the region of interest (ROI); and output 109 a new image.

In some examples, and as discussed further below, the instructions 103-109 on the memory 102 may be executed alone or in combination by the processor 101 to implement image modification functions via use of variable scanning orders. In some examples, image modification functions such as cropping, rotation and flipping (e.g., horizontal flipping, vertical flipping) may take place at the same time instead of individually and in sequence. In some examples, this may be achieved via use of the variable scanning order. Also, in some examples, the instructions 103-109 may be implemented in association with a content platform configured to provide content for users.

Additionally, although not depicted, it should be appreciated that to provide image modification functions via use of variable scanning orders, instructions 103-109 may be configured to utilize various artificial intelligence (AI) based machine learning (ML) tools. It should also be appreciated that the system 100 may provide other types of machine learning (ML) approaches, such as reinforcement learning, feature learning, anomaly detection, etc.

In some examples, the instructions 103 may partition an image into a plurality of image blocks. In particular, the instructions 103 may partition the image into a plurality of image blocks of size MxM pixels (i.e., the image block(s) may be square). In some examples, M may be 64.

In some examples, the instructions 104 may identify image blocks in a plurality of image blocks associated with a region of interest (ROI). In some examples, the instructions 104 may receive input from a user to select the region of interest (ROI). In some examples, the instruction 104 may receive coordinate information (e.g., x-y coordinates) to identify the region of interest (ROI) in the original image. In some examples, the instructions 104 may utilize partitioning and remainder techniques (as described above) to determine which image blocks (e.g., MxM image blocks) may contain the region of interest (ROI). In some examples, upon identification, the (remaining) blocks that may not associated with the region of interest (ROI) may be excluded from further processing (i.e., ignored).

In some examples, the instructions 105 may perform a single function image modification (i.e., a first type of image modification). As used herein, a "single function image" modification may include an image modification that may implement one image modification function only. Examples of the single function image modifications that may be implemented may include rotation, horizontal flipping, and vertical flipping, wherein the modification may be applied to an image or a portion of an image.

In some examples, the instructions 105 may perform the single function image modification on image blocks associated with a region of interest (ROI) (e.g., as identified via the instructions 104). In some examples, the instructions 105 may perform the single function image modification on an original image to generate a new image.

In some examples, the single function image modification performed by the instructions 105 may be rotation. In these examples and as discussed further below, the processing via the instructions 105 may include scanning (i.e., reading) and arranging (or re-arranging) the image blocks associated with a region of interest (ROI) in a rotation order (i.e., an "image modification order"). So, in some examples, a 90-degree clockwise rotation of an MxM image block may result in each pixel associated with the MxM image block being displaced to a new position in a new (re-arranged) MxM image block. In some examples, this new (re-arranged) MxM image block may be store in a memory (e.g., a buffer) and may be utilized in downstream processing (e.g., cropping, outputting, etc.) In some examples, the rotation order may include scanning each of the image blocks associated with the region of interest (ROI) in each column from bottom to top, scanning each column from left to right and arranging each the image blocks associated with the region of interest (ROI) from each scanned column as rows on top of each other to form a modified image including the region of interest (ROI). Accordingly, memory tiles that may be associated with each of the image blocks associated with the region of interest (ROI) may be scanned and arranged in a similar as well. It should be appreciated that in some examples, in instances where an region of interest (ROI)

may be large enough to cover a plurality of image blocks, the image blocks may be scanned in one of any number of directions, including horizontal or vertical, row by row from left to right or right to left, or column by column from top to bottom or bottom to top. So, in these examples, for each memory tile within a block, scanning may only be required for one direction since an M×M image block may consist of memory tiles with either a first dimension (e.g., width) of M or a second dimension (e.g., height) of M, where the other dimension may be a fraction of M.

Figure 4:
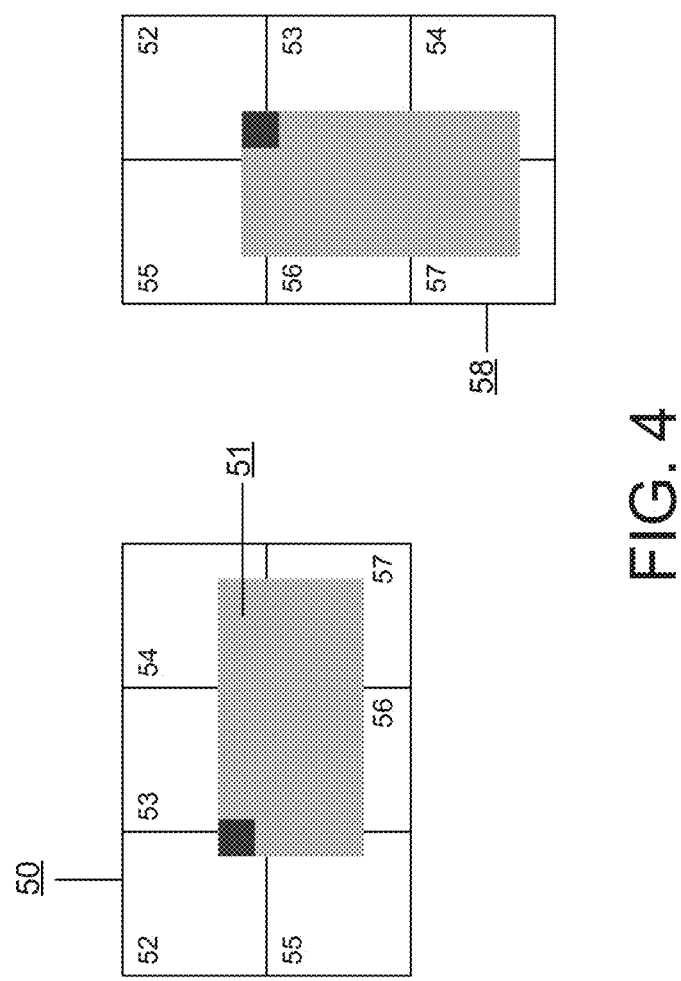
FIG. 4 illustrates a first example of a single function image modification.

A first example of a single function image modification is illustrated in FIG. 4. In the example illustrated in FIG. 4, a first plurality of image blocks 50 including the image blocks 52-57 may include a region of interest (ROI) 51. In some examples, to implement a rotation order, the instructions 105 may scan and arrange the plurality of image blocks 52-57 in the following order: image block 55, image block 52, image blocks 56, image block 53, image block 57, and image block 54, wherein image blocks 55 and 52 may arranged above image blocks 56 and 53, and image blocks 56 and 53 may be arranged above image blocks 57 and 54. In some examples, by scanning and arranging the plurality of image blocks 52-57 in a rotation order, a (resulting) new image 58 may be a rotated version of the plurality of image blocks 52-57.

It should further be appreciated that each image block in the plurality of image blocks in the region of interest (ROI) may be processed individually and in a sequential order. As such, processing of all pixels in each image block may remain contained within processing of the image block. And as result, processing of each image block may only need to be done once without need for adjustments during a following operation (e.g., a cropping operation).

In some examples, the single function image modification performed by the instructions 105 may be horizontal flipping. In these examples and as discussed further below, the processing via the instructions 105 may include scanning (i.e., reading) and arranging the image blocks associated with a region of interest (ROI) in a horizontal flipping order (i.e., an "image modification order"). In some examples, the horizontal flipping order may include scanning each of the image blocks associated with the region of interest (ROI) in each row from right to left, scanning each row of image blocks associated with the region of interest (ROI) from top to bottom and arranging each of the image blocks associated with the region of interest (ROI) from each scanned row as rows on top of each other to form a modified image including the region of interest (ROI). Accordingly, memory tiles that may be associated with each of the image blocks associated with the region of interest (ROI) may be scanned and arranged in a similar as well. It should be appreciated that in some examples, in instances where an region of interest (ROI) may be large enough to cover a plurality of image blocks, the image blocks may be scanned in one of any number of directions, including horizontal or vertical, row by row from left to right or right to left, or column by column from top to bottom or bottom to top. So, in these examples, for each memory tile within a block, scanning may only be required for one direction since an M×M image block may consist of memory tiles with either a first dimension (e.g., width) of M or a second dimension (e.g., height) of M, where the other dimension may be a fraction of M.

Figure 5:
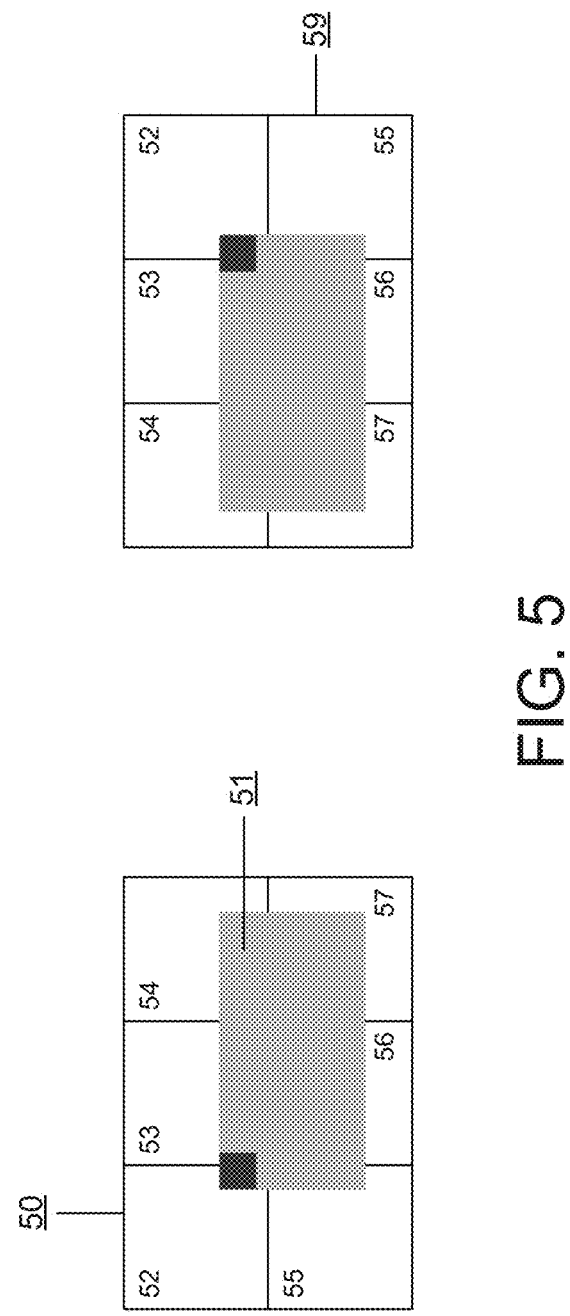
FIG. 5 illustrates a second example of a single function image modification.

A second example of a single function image modification is illustrated in FIG. 5. In the example illustrated in FIG. 5, a first plurality of image blocks 50 including the image blocks 52-57 may include a region of interest (ROI) 51 (similar to FIG. 4). In some examples, to implement a horizontal flipping order, the instructions 105 may scan and arrange the plurality of image blocks 52-57 in the following order: image block 54, image block 53, image blocks 52, image block 57, image block 56, and image block 55, wherein image blocks 54, 53 and 52 may be arranged above image blocks 57, 56 and 55. In some examples, by scanning and arranging the plurality of image blocks 52-57 in a horizontal flipping order accordingly, a (resulting) new image 59 may be a horizontally flipped version of the example image 50. In some examples, as discussed further below, the new image 59 may be cropped to create a new image including the region of interest (ROI) as well.

It should further be appreciated that each image block in the plurality of image blocks in the region of interest (ROI) may be processed individually and in a sequential order. As such, processing of all pixels in each image block may remain contained within processing of the image block. And as a result, processing of each image block may only need to be done once and without a need for adjustments during a following operation (e.g., a cropping operation).

In some examples, the single function image modification performed by the instructions 105 may be vertical flipping. In these examples and as discussed further below, the processing via the instructions 105 may include scanning (i.e., reading) and arranging the image blocks associated with the region of interest (ROI) in a vertical flipping order (i.e., an "image modification order"). In some examples, the vertical flipping order may include scanning each row of image blocks associated with the region of interest (ROI) from bottom to top, scanning each of the image blocks associated with the region of interest (ROI) in each row from left to right and arranging each scanned row on top of each other to form a modified image including the region of interest (ROI). Accordingly, memory tiles that may be associated with each of the image blocks associated with the region of interest (ROI) may be scanned and arranged in a similar as well. It should be appreciated that in some examples, in instances where an region of interest (ROI) may be large enough to cover a plurality of image blocks, the image blocks may be scanned in one of any number of directions, including horizontal or vertical, row by row from left to right or right to left, or column by column from top to bottom or bottom to top. So, in these examples, for each memory tile within a block, scanning may only be required for one direction since an M×M image block may consist of memory tiles with either a first dimension (e.g., width) of M or a second dimension (e.g., height) of M, where the other dimension may be a fraction of M.

Figure 6:
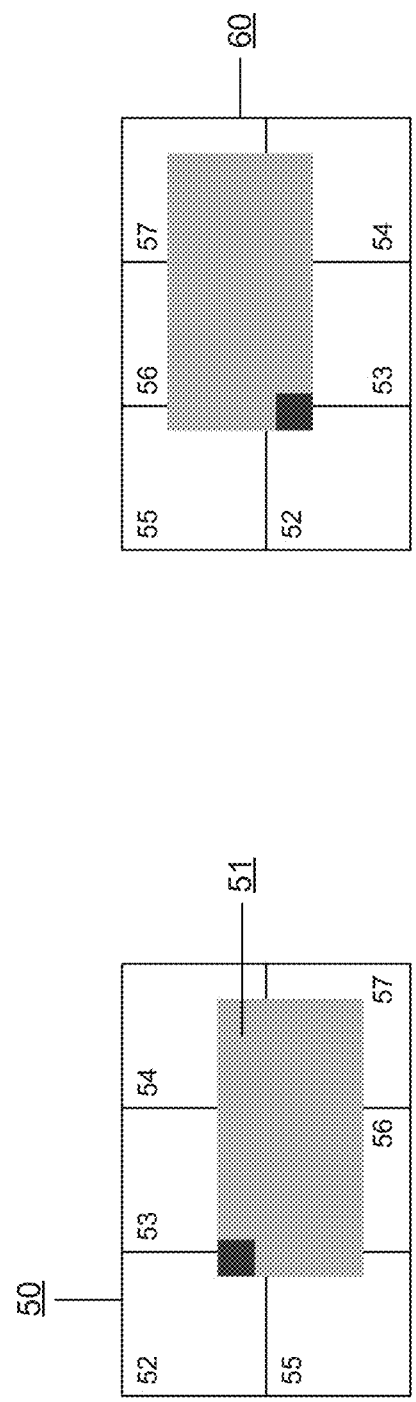
FIG. 6 illustrates a third example of a single function image modification.

A third example of a single function image modification is illustrated in FIG. 6. In the example illustrated in FIG. 6, a first plurality of image blocks 50 including the image blocks 52-57 may include a region of interest (ROI) 51 (similar to FIGS. 4-5). In some examples, to implement a vertical flipping order, the instructions 105 may scan and arrange the plurality of image blocks 52-57 in the following order: image block 55, image block 56, image blocks 57, image block 52, image block 53, and image block 54, wherein image blocks 55-57 may arranged above image blocks 52-54. In some examples, by scanning and arranging the plurality of image blocks 52-57 in a vertical flipping order accordingly, a (resulting) new image 60 may be a vertically flipped version of the plurality of image blocks 52-57.

It should further be appreciated that each image block in the plurality of image blocks in the region of interest (ROI) may be processed individually and in a sequential order. As such, processing of all pixels in each image block may remain contained within processing of the image block. And as a result, processing of each image block may only need to be done once and without a need for adjustments during a following operation (e.g., a cropping operation).

In some examples, the instructions 106 may perform a dual function image modification. As used herein, a "dual function image modification" may include an image modification that may combine a first and second modification function. Examples of the image modifications that may be combined may include horizontal flipping and vertical flipping, rotation and vertical flipping, and rotation and horizontal flipping. In some examples, the instructions 106 may perform the dual function image modification on an original image to generate a new image.

In some examples, the dual function image modification performed by the instructions 106 may include horizontal and vertical flipping. That is, in some examples, the instructions 106 may scan and arrange a plurality of image blocks associated with a region of interest in a manner that may reflect (i.e., "as if") the plurality of image blocks associated with the region of interest (ROI) being horizontally flipped and vertically flipped. It should be appreciated that the scanning and arranging may be regardless of ordering (i.e., horizontal flipping then vertical flipping, vertical flipping then horizontal flipping). In these examples and as discussed further below, the processing via the instructions 106 may include scanning (i.e., reading) and arranging the image blocks associated with the region of interest (ROI) in a horizontal and vertical flipping order (i.e., an "image modification order"). In some examples, the horizontal and vertical flipping order may include scanning each row of image blocks associated with the region of interest (ROI) from bottom to top, scanning each of the image blocks associated with the region of interest (ROI) in each row from right to left and arranging each the image blocks from each scanned row on top of each other to form a modified image including the region of interest (ROI). Accordingly, memory tiles that may be associated with each of the image blocks associated with the region of interest (ROI) may be scanned and arranged in a similar as well. It should be appreciated that in some examples, in instances where an region of interest (ROI) may be large enough to cover a plurality of image blocks, the image blocks may be scanned in one of any number of directions, including horizontal or vertical, row by row from left to right or right to left, or column by column from top to bottom or bottom to top. So, in these examples, for each memory tile within a block, scanning may only be required for one direction since an M×M image block may consist of memory tiles with either a first dimension (e.g., width) of M or a second dimension (e.g., height) of M, where the other dimension may be a fraction of M.

A first example of an dual function image modification is illustrated in FIG. 7. In the example illustrated in FIG. 7, a first plurality of image blocks 50 including the image blocks 52-57 may include a region of interest (ROI) 51 (similar to FIGS. 4-6). In some examples, to implement a horizontal and vertical flipping order, the instructions 106 may scan and arrange the plurality of image blocks 52-57 in the following order: image block 57, image block 56, image blocks 55, image block 54, image block 53, and image block 52, wherein image blocks 57-55 may arranged above image blocks 54-52. By scanning and arranging the plurality of image blocks 52-57 in a horizontally flipped and vertically flipped order accordingly, a (resulting) new image 61 may be a horizontally flipped and vertically flipped version of the plurality of image blocks 52-57.

It should further be appreciated that each image block in the plurality of image blocks in the region of interest (ROI) may be processed individually and in a sequential order. As such, processing of all pixels in each image block may remain contained within processing of the image block. And as a result, processing of each image block may only need to be done once and without a need for adjustments during a following operation (e.g., a cropping operation).

In some examples, the dual function image modification performed by the instructions 106 may include rotation and vertical flipping. That is, in some examples, the instructions 106 may scan and arrange a plurality of image blocks associated with a region of interest in a manner that may reflect the plurality of image blocks being rotated and vertically flipped. In these examples and as discussed further below, the processing via the instructions 106 may include scanning (i.e., reading) and arranging the image blocks associated with the region of interest (ROI) in a rotation and vertical flipping order (i.e., an "image modification order"). In some examples, the rotation and vertical flipping order may include scanning each of the image blocks in each column from bottom to top, scanning each column from right to left and arranging each the image blocks from each sequentially scanned column as rows on top of another to form a modified image including the region of interest (ROI). Accordingly, memory tiles that may be associated with each of the image blocks associated with the region of interest (ROI) may be scanned and arranged in a similar as well.

Furthermore, it should be appreciated that in some examples, an image generated via rotation followed by flipping (e.g., horizontal flipping, vertical flipping) may be different from an image generated via flipping followed by rotation. That is, it should be appreciated that, in some examples, a scanning order may change based on an ordering of image modification functions. So, in examples where vertical flipping may be followed by rotation, a scanning order may be image blocks 52, 55, 53, 56, 54, 57, where 52 and 55 may be arranged on top of image blocks 53 and 56, and image blocks 53 and 56 may be arranged on top of image blocks 54 and 57. Accordingly, in some examples, a resulting image will be different from an instance where rotation may be followed by vertical flipping.

It should be appreciated that in some examples, in instances where an region of interest (ROI) may be large enough to cover a plurality of image blocks, the image blocks may be scanned in one of any number of directions, including horizontal or vertical, row by row from left to right or right to left, or column by column from top to bottom or bottom to top. So, in these examples, for each memory tile within a block, scanning may only be required for one direction since an M×M image block may consist of memory tiles with either a first dimension (e.g., width) of M or a second dimension (e.g., height) of M, where the other dimension may be a fraction of M.

A second example of an dual function image modification is illustrated in FIG. 8. In the example illustrated in FIG. 8, a plurality of image blocks 50 including the plurality of image blocks 52-57 may include a region of interest (ROI) 51 (similar to FIGS. 4-7). In some examples, to implement a rotating and vertical flipping order, the instructions 106 may scan and arrange the plurality of image blocks 52-57 in the following order: image block 57, image block 54, image blocks 56, image block 53, image block 55, and image block 52, wherein image block 57 and image block 54 may arranged on top of image block 56 and image block 53, and image block 56 and image block 53 may arranged above image block 55 and image block 52. In some examples, by scanning and arranging the plurality of image blocks 52-57 in a rotation and vertical flipping order accordingly, a (resulting) new image 62 may be a rotated and vertically flipped version of the plurality of image blocks 52-57.

It should further be appreciated that each image block in the plurality of image blocks in a region of interest (ROI) may be processed individually and in a sequential order. Accordingly, processing of all pixels in each image block may remain contained within processing of the image block. As a result, processing of each image block may only need to be done once, without a need for adjustments during a following operation (e.g., a cropping operation).

In some examples, the dual function image modification performed by the instructions 106 may include rotation and horizontal flipping. That is, in some examples, the instructions 106 may scan and arrange a plurality of image blocks associated with a region of interest (ROI) in a manner that may reflect the plurality of image blocks associated with the region of interest (ROI) being rotated and horizontally flipped. It should be appreciated that the scanning and arranging may be regardless of ordering (i.e., rotation then horizontal flipping, horizontal flipping then rotation).

It should be appreciated that, in some examples, a scanning order may change based on an ordering of image modification functions. So, in examples where horizontal flipping may be followed by rotation, a scanning order may be image blocks 57, 54, 56, 53, 55, 52, where 57 and 54 may be arranged on top of image blocks 56 and 53, and image blocks 56 and 53 may be arranged on top of image blocks 55 and 52. Accordingly, in some examples, a resulting image will be different from an instance where rotation may be followed by horizontal flipping.

In these examples and as discussed further below, the processing via the instructions 106 may include scanning (i.e., reading) and arranging the image blocks associated with the region of interest (ROI) in a rotation and horizontal flipping order (i.e., an "image modification order"). In some examples, processing the image blocks in the region of interest (ROI) in the rotation and horizontal flipping order may include scanning each of the image blocks in each column from top to bottom, scanning each column from left to right and arranging each the image blocks from each scanned column as rows on top of each other to form a modified image including the region of interest (ROI). Accordingly, memory tiles that may be associated with each of the image blocks associated with the region of interest (ROI) may be scanned and arranged in a similar as well. It should be appreciated that in some examples, in instances where an region of interest (ROI) may be large enough to cover a plurality of image blocks, the image blocks may be scanned in one of any number of directions, including horizontal or vertical, row by row from left to right or right to left, or column by column from top to bottom or bottom to top. So, in these examples, for each memory tile within a block, scanning may only be required for one direction since an M×M image block may consist of memory tiles with either a first dimension (e.g., width) of M or a second dimension (e.g., height) of M, where the other dimension may be a fraction of M.

A third example of an dual function image modification is illustrated in FIG. 9. In the example illustrated in FIG. 9, a first plurality of image blocks 50 including the image blocks 52-57 may include a region of interest (ROI) 51 (similar to FIGS. 4-8). In some examples, to implement a rotating and vertical flipping order, the instructions 106 may scan and arrange the plurality of image blocks 52-57 in the following order: image block 52, image block 55, image blocks 53, image block 56, image block 54, and image block 57, wherein image block 52 and image block 55 may be arranged on top of image block 53 and image block 56, and image block 53 and image block 56 may be arranged above image block 54 and image block 57. In some examples, by scanning and arranging the plurality of image blocks 52-57 in a rotation and horizontal flipping order accordingly, a (resulting) new image 63 may be a rotated and horizontally flipped version of the plurality of image blocks 52-57.

It should further be appreciated that each image block in the plurality of image blocks in the region of interest (ROI) may be processed individually and in a sequential order. Accordingly, processing of all pixels in each image block may remain contained within processing of the image block. As a result, processing of each image block may only need to be done once, without a need for adjustments during a following operation (e.g., a cropping operation).

In some examples, the instructions 107 may perform a triple function image modification. As used herein, a "triple function image modification" may include an image modification that may combine a first, second and third modification function. Examples of the image modifications that may be combined may include rotation, horizontal flipping and vertical flipping. In some examples, the instructions 107 may perform the triple function image modification on an original image to generate a new image.

In some examples, the triple function image modification performed by the instructions 107 may include rotation, horizontal flipping and vertical flipping. That is, in some examples, the instructions 107 may scan and arrange a plurality of image blocks associated with a region of interest (ROI) in a manner that may reflect (i.e., "as if") the plurality of image blocks associated with the region of interest (ROI) had been rotated, horizontally flipped and vertically flipped. It should be appreciated that upon rotating, horizontally flipping and vertical flipping the plurality of image blocks associated with the region of interest (ROI), the plurality of image blocks may be arranged in a manner as if they may have been rotated two-hundred and seventy degrees (i.e., "a 270° degree rotation"). It should also be appreciated that in examples where horizontal flipping may be applied first, followed by 90 degree (90°) rotation and then vertical flipping, a resulting image may be equivalent to a 90 degree (90°) rotation.

Furthermore, it should also be appreciated that the scanning and arranging may be regardless of ordering (i.e., rotating, horizontal flipping then vertical flipping, or rotating, vertical flipping then horizontal flipping). In these examples and as discussed further below, the processing via the instructions 107 may include scanning (i.e., reading) and arranging the image blocks associated with the region of interest (ROI) in a rotating, horizontal flipping and vertical flipping order (i.e., an "image modification order"). In some examples, the rotating, horizontal flipping and vertical flipping order may include scanning each column from right to left, scanning each of the image blocks in each column from top to bottom, and arranging each the image blocks from each scanned column as rows on top of each other to form a modified image including the region of interest (ROI). Accordingly, memory tiles that may be associated with each of the image blocks associated with the region of interest (ROI) may be scanned and arranged in a similar as well. It should be appreciated that in some examples, in instances where an region of interest (ROI) may be large enough to cover a plurality of image blocks, the image blocks may be scanned in one of any number of directions, including horizontal or vertical, row by row from left to right or right to left, or column by column from top to bottom or bottom to top. So, in these examples, for each memory tile within a block, scanning may only be required for one direction since an M×M image block may consist of memory tiles with either a first dimension (e.g., width) of M or a second dimension (e.g., height) of M, where the other dimension may be a fraction of M.

Figure 10:
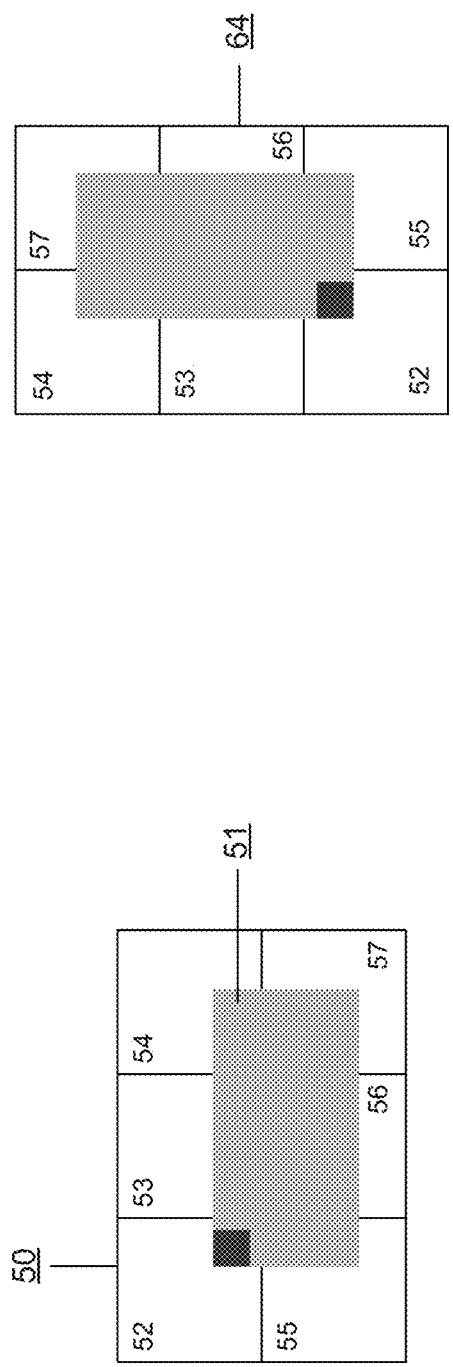
FIG. 10 illustrates an example of an triple function image modification.

An example of an triple function image modification is illustrated in FIG. 10. In the example illustrated in FIG. 10, a first plurality of image blocks 50 including the image blocks 52-57 may include a region of interest (ROI) 51 (similar to FIGS. 4-9). In some examples, to implement a rotation followed by horizontal and vertical flipping order, the instructions 107 may scan and arrange the plurality of image blocks 52-57 in the following order: image block 54, image block 57, image blocks 53, image block 56, image block 52, and image block 55, wherein image block 54 and image block 57 may be arranged above image block 53 and image block 56, and image block 53 and image block 56 may be arranged image 52 and image block 55. In some examples, by scanning and arranging the plurality of image blocks 52-57 in a rotation, horizontal flipping and vertical flipping order accordingly, a (resulting) new image 64 may be a rotated, horizontally flipped, vertically flipped version of the plurality of image blocks 52-57.

It should further be appreciated that each image block in the plurality of image blocks in a region of interest (ROI) may be processed individually and in a sequential order. As such, processing of all pixels in each image block may remain contained within processing of the image block. And as a result, processing of each image block may only need to be done once and without a need for adjustments during a following operation (e.g., a cropping operation).

In some examples, the instructions 108 may crop a modified image (e.g., as generated by the instructions 105, the instructions 106 or the instructions 107) to generate a new image. As discussed above, to crop a modified image, the instructions 108 may crop image blocks associated with a region of interest (ROI). It should be appreciated that, in some examples, to crop the region of interest (ROI), remaining image blocks outside of the region of interest (ROI) may not require any processing at all, and may be excluded. In some examples, to crop a region of interest (ROI), the instructions 108 may implement memory tiles associated with image blocks associated with a region of interest (ROI) (as discussed above), and may extract the memory tiles to be cropped in a raster scan order. In some examples, memory tiles of the (re-arranged) image blocks may be extracted from top to bottom. Furthermore, the instructions 108 may arrange the cropped memory tiles to generate the new image.

In some examples, the instructions 109 may output a new image. In some examples, to output the new image, the instructions 109 may output the new image generated via the instructions 108 (i.e., upon arranging of the cropped memory tiles to generate the new image).

Figure 11:
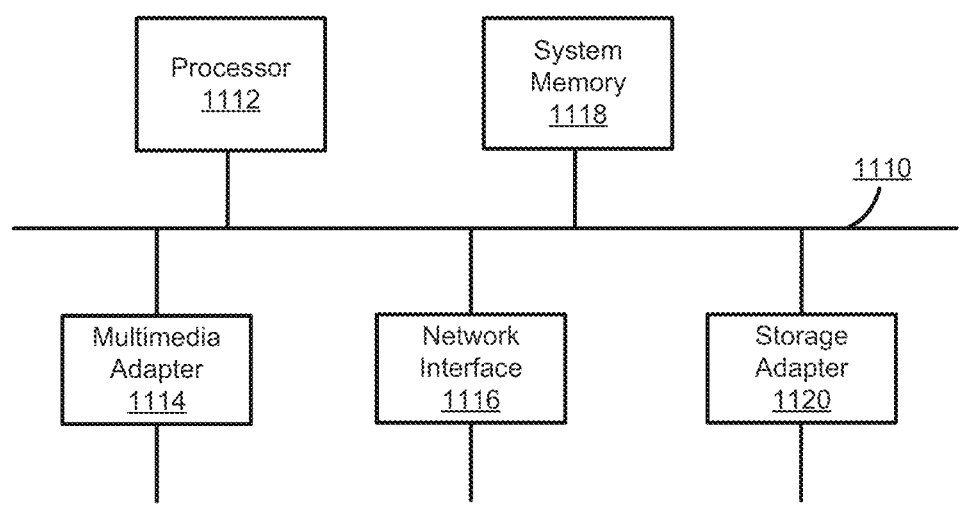
FIG. 11 illustrates a block diagram of a computer system for implementing image modification functions via use of variable scanning orders, according to an example.

FIG. 11 illustrates a block diagram of a computer system for implementing image modification functions via use of variable scanning orders, according to an example. In some examples, the system 1100 may be associated the system 100 to perform the functions and features described herein. The system 1100 may include, among other things, an interconnect 1110, a processor 1112, a multimedia adapter 1114, a network interface 1116, a system memory 1118, and a storage adapter 1120.

The interconnect 1110 may interconnect various subsystems, elements, and/or components of the external system 1100. As shown, the interconnect 1110 may be an abstraction that may represent any one or more separate physical buses, point-to-point connections, or both, connected by appropriate bridges, adapters, or controllers. In some examples, the interconnect 1110 may include a system bus, a peripheral component interconnect (PCI) bus or PCI-Express bus, a HyperTransport or industry standard architecture (ISA)) bus, a small computer system interface (SCSI) bus, a universal serial bus (USB), IIC (I2C) bus, or an Institute of Electrical and Electronics Engineers (IEEE) standard 1394 bus, or "firewire," or other similar interconnection element.

In some examples, the interconnect 1110 may allow data communication between the processor 1112 and system memory 1118, which may include read-only memory (ROM) or flash memory (neither shown), and random access memory (RAM) (not shown). It should be appreciated that the RAM may be the main memory into which an operating system and various application programs may be loaded. The ROM or flash memory may contain, among other code, the Basic Input-Output system (BIOS) which controls basic hardware operation such as the interaction with one or more peripheral components.

The processor 1112 may be the central processing unit (CPU) of the computing device and may control overall operation of the computing device. In some examples, the processor 1112 may accomplish this by executing software or firmware stored in system memory 1118 or other data via the storage adapter 1120. The processor 1112 may be, or may include, one or more programmable general-purpose or special-purpose microprocessors, digital signal processors (DSPs), programmable controllers, application specific integrated circuits (ASICs), programmable logic device (PLDs), trust platform modules (TPMs), field-programmable gate arrays (FPGAs), other processing circuits, or a combination of these and other devices.

The multimedia adapter 1114 may connect to various multimedia elements or peripherals. These may include devices associated with visual (e.g., video card or display), audio (e.g., sound card or speakers), and/or various input/output interfaces (e.g., mouse, keyboard, touchscreen).

The network interface 1116 may provide the computing device with an ability to communicate with a variety of remote devices over a network (e.g., network 400 of FIG. 1A) and may include, for example, an Ethernet adapter, a Fibre Channel adapter, and/or other wired- or wireless-enabled adapter. The network interface 1116 may provide a direct or indirect connection from one network element to another, and facilitate communication and between various network elements.

The storage adapter 1120 may connect to a standard computer-readable medium for storage and/or retrieval of information, such as a fixed disk drive (internal or external).

Many other devices, components, elements, or subsystems (not shown) may be connected in a similar manner to the interconnect 1110 or via a network (e.g., network 400 of FIG. 3A). Conversely, all of the devices shown in FIG. 11 need not be present to practice the present disclosure. The devices and subsystems can be interconnected in different ways from that shown in FIG. 11. Code to implement the dynamic approaches for payment gateway selection and payment transaction processing of the present disclosure may be stored in computer-readable storage media such as one or more of system memory 1118 or other storage. Code to implement the dynamic approaches for payment gateway selection and payment transaction processing of the present disclosure may also be received via one or more interfaces and stored in memory. The operating system provided on system 100 may be MS-DOS, MS-WINDOWS, OS/2, OS X, IOS, ANDROID, UNIX, Linux, or another operating system.

Figure 12:
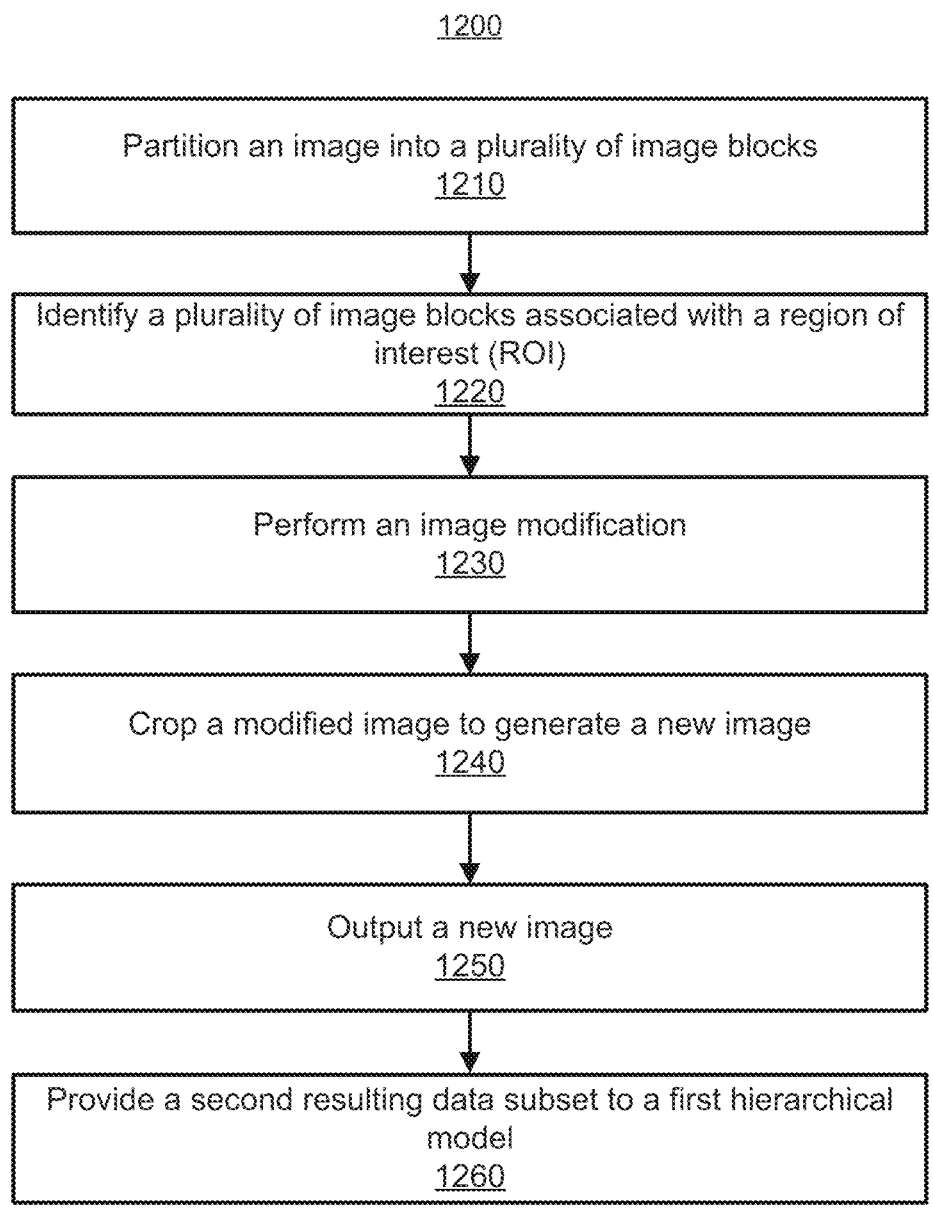
FIG. 12 illustrates a method for implementing image modification functions via use of variable scanning orders, according to an example.

FIG. 12 illustrates a method 1200 for implementing image modification functions via use of variable scanning orders, according to an example. The method 1200 is provided by way of example, as there may be a variety of ways to carry out the method described herein. Each block shown in FIG. 12 may further represent one or more processes, methods, or subroutines, and one or more of the blocks may include machine-readable instructions stored on a non-transitory computer-readable medium and executed by a processor or other type of processing circuit to perform one or more operations described herein.

Although the method 1200 is primarily described as being performed by system 100 as shown in FIGS. 3A-B, the method 1200 may be executed or otherwise performed by other systems, or a combination of systems. It should be appreciated that, in some examples, the method 1200 may be configured to incorporate artificial intelligence (AI) or deep learning techniques, as described above. It should also be appreciated that, in some examples, the method 1200 may be implemented in conjunction with a content platform (e.g., a social media platform) to generate and deliver content.

Reference is now made with respect to FIG. 12. At 1210, the processor 101 may partition an image into a plurality of image blocks. In particular, similar to the examples discussed above, the processor 101 may partition the image into a plurality of image blocks of size M×M pixels (i.e., the image block(s) may be square). In some examples, M may be 64.

At 1220, the processor 101 may identify image blocks in a plurality of image blocks associated with a region of interest (ROI). In some examples, upon identification, the (remaining) blocks that may not associated with the region of interest (ROI) may be excluded from further processing (i.e., ignored).

At 1230, the processor 101 may perform an image modification. In some examples, the processor 101 may perform a single function image modification. Examples may include rotation, horizontal flipping or vertical flipping. In other examples, the processor 101 may perform a dual function image modification. Examples may include rotation and horizontal flipping, rotation and vertical flipping, and horizontal flipping and vertical flipping. In still other examples, the processor 101 may perform a triple function image modification. An example may include rotation, horizontal flipping and vertical flipping.

At 1240, the processor 101 may crop a modified image to generate a new image. As discussed above, to crop a modified image, the instructions 108 may crop image blocks associated with a region of interest (ROI).

At 1250, the processor 101 output a new image. In some examples, the new image outputted may be the cropped version of the (modified) image.

Although the methods and systems as described herein may be directed mainly to digital content, such as videos or interactive media, it should be appreciated that the methods and systems as described herein may be used for other types of content or scenarios as well. Other applications or uses of the methods and systems as described herein may also include social networking, marketing, content-based recommendation engines, and/or other types of knowledge or data-driven systems.

It should be noted that the functionality described herein may be subject to one or more privacy policies, described below, enforced by the system 100, the external system 200, and the user devices 300 that may bar use of images for concept detection, recommendation, generation, and analysis.

In particular examples, one or more objects of a computing system may be associated with one or more privacy settings. The one or more objects may be stored on or otherwise associated with any suitable computing system or application, such as, for example, the system 100, the external system 200, and the user devices 300, a social-networking application, a messaging application, a photo-sharing application, or any other suitable computing system or application. Although the examples discussed herein may be in the context of an online social network, these privacy settings may be applied to any other suitable computing system. Privacy settings (or "access settings") for an object may be stored in any suitable manner, such as, for example, in association with the object, in an index on an authorization server, in another suitable manner, or any suitable combination thereof. A privacy setting for an object may specify how the object (or particular information associated with the object) can be accessed, stored, or otherwise used (e.g., viewed, shared, modified, copied, executed, surfaced, or identified) within the online social network. When privacy settings for an object allow a particular user or other entity to access that object, the object may be described as being "visible" with respect to that user or other entity. As an example and not by way of limitation, a user of the online social network may specify privacy settings for a user-profile page that identify a set of users that may access work-experience information on the user-profile page, thus excluding other users from accessing that information.

In particular examples, privacy settings for an object may specify a "blocked list" of users or other entities that should not be allowed to access certain information associated with the object. In particular examples, the blocked list may include third-party entities. The blocked list may specify one or more users or entities for which an object is not visible. As an example and not by way of limitation, a user may specify a set of users who may not access photo albums associated with the user, thus excluding those users from accessing the photo albums (while also possibly allowing certain users not within the specified set of users to access the photo albums). In particular examples, privacy settings may be associated with particular social-graph elements. Privacy settings of a social-graph element, such as a node or an edge, may specify how the social-graph element, information associated with the social-graph element, or objects associated with the social-graph element can be accessed using the online social network. As an example and not by way of limitation, a particular concept node corresponding to a particular photo may have a privacy setting specifying that the photo may be accessed only by users tagged in the photo and friends of the users tagged in the photo. In particular examples, privacy settings may allow users to opt in to or opt out of having their content, information, or actions stored/logged by the system 100, the external system 200, and the user devices 300, or shared with other systems. Although this disclosure describes using particular privacy settings in a particular manner, this disclosure contemplates using any suitable privacy settings in any suitable manner.

In particular examples, the system 100, the external system 200, and the user devices 300 may present a "privacy wizard" (e.g., within a webpage, a module, one or more dialog boxes, or any other suitable interface) to the first user to assist the first user in specifying one or more privacy settings. The privacy wizard may display instructions, suitable privacy-related information, current privacy settings, one or more input fields for accepting one or more inputs from the first user specifying a change or confirmation of privacy settings, or any suitable combination thereof. In particular examples, the system 100, the external system 200, and the user devices 300 may offer a "dashboard" functionality to the first user that may display, to the first user, current privacy settings of the first user. The dashboard functionality may be displayed to the first user at any appropriate time (e.g., following an input from the first user summoning the dashboard functionality, following the occurrence of a particular event or trigger action). The dashboard functionality may allow the first user to modify one or more of the first user's current privacy settings at any time, in any suitable manner (e.g., redirecting the first user to the privacy wizard).

Privacy settings associated with an object may specify any suitable granularity of permitted access or denial of access. As an example and not by way of limitation, access or denial of access may be specified for particular users (e.g., only me, my roommates, my boss), users within a particular degree-of-separation (e.g., friends, friends-of-friends), user groups (e.g., the gaming club, my family), user networks (e.g., employees of particular employers, students or alumni of particular university), all users ("public"), no users ("private"), users of third-party systems, particular applications (e.g., third-party applications, external websites), other suitable entities, or any suitable combination thereof. Although this disclosure describes particular granularities of permitted access or denial of access, this disclosure contemplates any suitable granularities of permitted access or denial of access.

In particular examples, different objects of the same type associated with a user may have different privacy settings. Different types of objects associated with a user may have different types of privacy settings. As an example and not by way of limitation, a first user may specify that the first user's status updates are public, but any images shared by the first user are visible only to the first user's friends on the online social network. As another example and not by way of limitation, a user may specify different privacy settings for different types of entities, such as individual users, friends-of-friends, followers, user groups, or corporate entities. As another example and not by way of limitation, a first user may specify a group of users that may view videos posted by the first user, while keeping the videos from being visible to the first user's employer. In particular examples, different privacy settings may be provided for different user groups or user demographics. As an example and not by way of limitation, a first user may specify that other users who attend the same university as the first user may view the first user's pictures, but that other users who are family members of the first user may not view those same pictures.

In particular examples, the system 100, the external system 200, and the user devices 300 may provide one or more default privacy settings for each object of a particular object-type. A privacy setting for an object that is set to a default may be changed by a user associated with that object. As an example and not by way of limitation, all images posted by a first user may have a default privacy setting of being visible only to friends of the first user and, for a particular image, the first user may change the privacy setting for the image to be visible to friends and friends-of-friends.

In particular examples, privacy settings may allow a first user to specify (e.g., by opting out, by not opting in) whether the system 100, the external system 200, and the user devices 300 may receive, collect, log, or store particular objects or information associated with the user for any purpose. In particular examples, privacy settings may allow the first user to specify whether particular applications or processes may access, store, or use particular objects or information associated with the user. The privacy settings may allow the first user to opt in or opt out of having objects or information accessed, stored, or used by specific applications or processes. The system 100, the external system 200, and the user devices 300 may access such information in order to provide a particular function or service to the first user, without the system 100, the external system 200, and the user devices 300 having access to that information for any other purposes. Before accessing, storing, or using such objects or information, the system 100, the external system 200, and the user devices 300 may prompt the user to provide privacy settings specifying which applications or processes, if any, may access, store, or use the object or information prior to allowing any such action. As an example and not by way of limitation, a first user may transmit a message to a second user via an application related to the online social network (e.g., a messaging app), and may specify privacy settings that such messages should not be stored by the system 100, the external system 200, and the user devices 300.

In particular examples, a user may specify whether particular types of objects or information associated with the first user may be accessed, stored, or used by the system 100, the external system 200, and the user devices 300. As an example and not by way of limitation, the first user may specify that images sent by the first user through the system 100, the external system 200, and the user devices 300 may not be stored by the system 100, the external system 200, and the user devices 300. As another example and not by way of limitation, a first user may specify that messages sent from the first user to a particular second user may not be stored by the system 100, the external system 200, and the user devices 300. As yet another example and not by way of limitation, a first user may specify that all objects sent via a particular application may be saved by the system 100, the external system 200, and the user devices 300.

In particular examples, privacy settings may allow a first user to specify whether particular objects or information associated with the first user may be accessed from the system 100, the external system 200, and the user devices 300. The privacy settings may allow the first user to opt in or opt out of having objects or information accessed from a particular device (e.g., the phone book on a user's smart phone), from a particular application (e.g., a messaging app), or from a particular system (e.g., an email server). The system 100, the external system 200, and the user devices 300 may provide default privacy settings with respect to each device, system, or application, and/or the first user may be prompted to specify a particular privacy setting for each context. As an example and not by way of limitation, the first user may utilize a location-services feature of the system 100, the external system 200, and the user devices 300 to provide recommendations for restaurants or other places in proximity to the user. The first user's default privacy settings may specify that the system 100, the external system 200, and the user devices 300 may use location information provided from one of the user devices 300 of the first user to provide the location-based services, but that the system 100, the external system 200, and the user devices 300 may not store the location information of the first user or provide it to any external system. The first user may then update the privacy settings to allow location information to be used by a third-party image-sharing application in order to geo-tag photos.

In particular examples, privacy settings may allow a user to specify whether current, past, or projected mood, emotion, or sentiment information associated with the user may be determined, and whether particular applications or processes may access, store, or use such information. The privacy settings may allow users to opt in or opt out of having mood, emotion, or sentiment information accessed, stored, or used by specific applications or processes. The system 100, the external system 200, and the user devices 300 may predict or determine a mood, emotion, or sentiment associated with a user based on, for example, inputs provided by the user and interactions with particular objects, such as pages or content viewed by the user, posts or other content uploaded by the user, and interactions with other content of the online social network. In particular examples, the system 100, the external system 200, and the user devices 300 may use a user's previous activities and calculated moods, emotions, or sentiments to determine a present mood, emotion, or sentiment. A user who wishes to enable this functionality may indicate in their privacy settings that they opt in to the system 100, the external system 200, and the user devices 300 receiving the inputs necessary to determine the mood, emotion, or sentiment. As an example and not by way of limitation, the system 100, the external system 200, and the user devices 300 may determine that a default privacy setting is to not receive any information necessary for determining mood, emotion, or sentiment until there is an express indication from a user that the system 100, the external system 200, and the user devices 300 may do so. By contrast, if a user does not opt in to the system 100, the external system 200, and the user devices 300 receiving these inputs (or affirmatively opts out of the system 100, the external system 200, and the user devices 300 receiving these inputs), the system 100, the external system 200, and the user devices 300 may be prevented from receiving, collecting, logging, or storing these inputs or any information associated with these inputs. In particular examples, the system 100, the external system 200, and the user devices 300 may use the predicted mood, emotion, or sentiment to provide recommendations or advertisements to the user. In particular examples, if a user desires to make use of this function for specific purposes or applications, additional privacy settings may be specified by the user to opt in to using the mood, emotion, or sentiment information for the specific purposes or applications. As an example and not by way of limitation, the system 100, the external system 200, and the user devices 300 may use the user's mood, emotion, or sentiment to provide newsfeed items, pages, friends, or advertisements to a user. The user may specify in their privacy settings that the system 100, the external system 200, and the user devices 300 may determine the user's mood, emotion, or sentiment. The user may then be asked to provide additional privacy settings to indicate the purposes for which the user's mood, emotion, or sentiment may be used. The user may indicate that the system 100, the external system 200, and the user devices 300 may use his or her mood, emotion, or sentiment to provide newsfeed content and recommend pages, but not for recommending friends or advertisements. The system 100, the external system 200, and the user devices 300 may then only provide newsfeed content or pages based on user mood, emotion, or sentiment, and may not use that information for any other purpose, even if not expressly prohibited by the privacy settings.

In particular examples, privacy settings may allow a user to engage in the ephemeral sharing of objects on the online social network. Ephemeral sharing refers to the sharing of objects (e.g., posts, photos) or information for a finite period of time. Access or denial of access to the objects or information may be specified by time or date. As an example and not by way of limitation, a user may specify that a particular image uploaded by the user is visible to the user's friends for the next week, after which time the image may no longer be accessible to other users. As another example and not by way of limitation, a company may post content related to a product release ahead of the official launch, and specify that the content may not be visible to other users until after the product launch.

In particular examples, for particular objects or information having privacy settings specifying that they are ephemeral, the system 100, the external system 200, and the user devices 300 may be restricted in its access, storage, or use of the objects or information. The system 100, the external system 200, and the user devices 300 may temporarily access, store, or use these particular objects or information in order to facilitate particular actions of a user associated with the objects or information, and may subsequently delete the objects or information, as specified by the respective privacy settings. As an example and not by way of limitation, a first user may transmit a message to a second user, and the system 100, the external system 200, and the user devices 300 may temporarily store the message in a content data store until the second user has viewed or downloaded the message, at which point the system 100, the external system 200, and the user devices 300 may delete the message from the data store. As another example and not by way of limitation, continuing with the prior example, the message may be stored for a specified period of time (e.g., 2 weeks), after which point the system 100, the external system 200, and the user devices 300 may delete the message from the content data store.

In particular examples, privacy settings may allow a user to specify one or more geographic locations from which objects can be accessed. Access or denial of access to the objects may depend on the geographic location of a user who is attempting to access the objects. As an example and not by way of limitation, a user may share an object and specify that only users in the same city may access or view the object. As another example and not by way of limitation, a first user may share an object and specify that the object is visible to second users only while the first user is in a particular location. If the first user leaves the particular location, the object may no longer be visible to the second users. As another example and not by way of limitation, a first user may specify that an object is visible only to second users within a threshold distance from the first user. If the first user subsequently changes location, the original second users with access to the object may lose access, while a new group of second users may gain access as they come within the threshold distance of the first user.

In particular examples, the system 100, the external system 200, and the user devices 300 may have functionalities that may use, as inputs, personal or biometric information of a user for user-authentication or experience-personalization purposes. A user may opt to make use of these functionalities to enhance their experience on the online social network. As an example and not by way of limitation, a user may provide personal or biometric information to the system 100, the external system 200, and the user devices 300. The user's privacy settings may specify that such information may be used only for particular processes, such as authentication, and further specify that such information may not be shared with any external system or used for other processes or applications associated with the system 100, the external system 200, and the user devices 300. As another example and not by way of limitation, the system 100, the external system 200, and the user devices 300 may provide a functionality for a user to provide voice-print recordings to the online social network. As an example and not by way of limitation, if a user wishes to utilize this function of the online social network, the user may provide a voice recording of his or her own voice to provide a status update on the online social network. The recording of the voice-input may be compared to a voice print of the user to determine what words were spoken by the user. The user's privacy setting may specify that such voice recording may be used only for voice-input purposes (e.g., to authenticate the user, to send voice messages, to improve voice recognition in order to use voice-operated features of the online social network), and further specify that such voice recording may not be shared with any external system or used by other processes or applications associated with the system 100, the external system 200, and the user devices 300. As another example and not by way of limitation, the system 100, the external system 200, and the user devices 300 may provide a functionality for a user to provide a reference image (e.g., a facial profile, a retinal scan) to the online social network. The online social network may compare the reference image against a later-received image input (e.g., to authenticate the user, to tag the user in photos). The user's privacy setting may specify that such voice recording may be used only for a limited purpose (e.g., authentication, tagging the user in photos), and further specify that such voice recording may not be shared with any external system or used by other processes or applications associated with the system 100, the external system 200, and the user devices 300.

In particular examples, changes to privacy settings may take effect retroactively, affecting the visibility of objects and content shared prior to the change. As an example and not by way of limitation, a first user may share a first image and specify that the first image is to be public to all other users. At a later time, the first user may specify that any images shared by the first user should be made visible only to a first user group. The system 100, the external system 200, and the user devices 300 may determine that this privacy setting also applies to the first image and make the first image visible only to the first user group. In particular examples, the change in privacy settings may take effect only going forward. Continuing the example above, if the first user changes privacy settings and then shares a second image, the second image may be visible only to the first user group, but the first image may remain visible to all users. In particular examples, in response to a user action to change a privacy setting, the system 100, the external system 200, and the user devices 300 may further prompt the user to indicate whether the user wants to apply the changes to the privacy setting retroactively. In particular examples, a user change to privacy settings may be a one-off change specific to one object. In particular examples, a user change to privacy may be a global change for all objects associated with the user.

In particular examples, the system 100, the external system 200, and the user devices 300 may determine that a first user may want to change one or more privacy settings in response to a trigger action associated with the first user. The trigger action may be any suitable action on the online social network. As an example and not by way of limitation, a trigger action may be a change in the relationship between a first and second user of the online social network (e.g., "un-friending" a user, changing the relationship status between the users). In particular examples, upon determining that a trigger action has occurred, the system 100, the external system 200, and the user devices 300 may prompt the first user to change the privacy settings regarding the visibility of objects associated with the first user. The prompt may redirect the first user to a workflow process for editing privacy settings with respect to one or more entities associated with the trigger action. The privacy settings associated with the first user may be changed only in response to an explicit input from the first user, and may not be changed without the approval of the first user. As an example and not by way of limitation, the workflow process may include providing the first user with the current privacy settings with respect to the second user or to a group of users (e.g., un-tagging the first user or second user from particular objects, changing the visibility of particular objects with respect to the second user or group of users), and receiving an indication from the first user to change the privacy settings based on any of the methods described herein, or to keep the existing privacy settings.

In particular examples, a user may need to provide verification of a privacy setting before allowing the user to perform particular actions on the online social network, or to provide verification before changing a particular privacy setting. When performing particular actions or changing a particular privacy setting, a prompt may be presented to the user to remind the user of his or her current privacy settings and to ask the user to verify the privacy settings with respect to the particular action. Furthermore, a user may need to provide confirmation, double-confirmation, authentication, or other suitable types of verification before proceeding with the particular action, and the action may not be complete until such verification is provided. As an example and not by way of limitation, a user's default privacy settings may indicate that a person's relationship status is visible to all users (e.g., "public"). However, if the user changes his or her relationship status, the system 100, the external system 200, and the user devices 300 may determine that such action may be sensitive and may prompt the user to confirm that his or her relationship status should remain public before proceeding. As another example and not by way of limitation, a user's privacy settings may specify that the user's posts are visible only to friends of the user. However, if the user changes the privacy setting for his or her posts to being public, the system 100, the external system 200, and the user devices 300 may prompt the user with a reminder of the user's current privacy settings of posts being visible only to friends, and a warning that this change will make all of the user's past posts visible to the public. The user may then be required to provide a second verification, input authentication credentials, or provide other types of verification before proceeding with the change in privacy settings. In particular examples, a user may need to provide verification of a privacy setting on a periodic basis. A prompt or reminder may be periodically sent to the user based either on time elapsed or a number of user actions. As an example and not by way of limitation, the system 100, the external system 200, and the user devices 300 may send a reminder to the user to confirm his or her privacy settings every six months or after every ten photo posts. In particular examples, privacy settings may also allow users to control access to the objects or information on a per-request basis. As an example and not by way of limitation, the system 100, the external system 200, and the user devices 300 may notify the user whenever an external system attempts to access information associated with the user, and require the user to provide verification that access should be allowed before proceeding.

What has been described and illustrated herein are examples of the disclosure along with some variations. The terms, descriptions, and figures used herein are set forth by way of illustration only and are not meant as limitations. Many variations are possible within the scope of the disclosure, which is intended to be defined by the following claims—and their equivalents—in which all terms are meant in their broadest reasonable sense unless otherwise indicated.

The invention claimed is:

1. A system, comprising:
   a processor;
   a memory storing instructions, which when executed by the processor, cause the processor to:
   partition an image into a plurality of image blocks;
   identify one or more image blocks of the plurality of image blocks associated with a region of interest (ROI), including identifying a remaining portion of an image block and processing the remaining portion of the image block with image blocks in a next row;
   scan the one or more image blocks in an image modification order, comprising scanning the one or more of the image blocks in a column from bottom to top and scanning each column of a plurality of columns from left to right;
   arrange the one or more image blocks according to the image modification order to form a modified image including the region of interest (ROI), comprising arranging image blocks from each scanned column as rows on top of each other; and
   crop the region of interest (ROI) in the modified image to form a new image.

2. The system of claim 1, wherein the image modification order further comprises a triple function image modification.

3. The system of claim 2, wherein the triple function image modification comprises:
   a first function;
   a second function; and
   a third function,
   wherein the first function is rotation, the second function is horizontal flipping, and the third function is vertical flipping.

4. The system of claim 3, wherein:
   scanning the one or more image blocks further comprises scanning image blocks in a column from top to bottom and scan each column of a plurality of columns from right to left; and
   arranging the one or more image blocks further comprises arranging image blocks from each scanned column as rows placed on top of each other.

5. A method for implementing image modification functions via use of variable scanning orders, comprising:
   partitioning an image into a plurality of image blocks;
   identifying one or more image blocks of the plurality of image blocks associated with a region of interest (ROI), including identifying a remaining portion of an image block and processing the remaining portion of the image block with image blocks in a next row,
   scanning the one or more image blocks in an image modification order, comprising scanning the one or more of the image blocks in a row from right to left and scanning each row of a plurality of row from top to bottom; and
   arranging the one or more image blocks according to the image modification order to form a modified image including the region of interest (ROI), comprising arranging image blocks from each scanned row as rows on top of each other.

6. The method of claim 5, wherein the image modification order further comprises a dual function image modification.

7. The method of claim 6, wherein the dual function image modification comprises:
   a first function; and
   a second function,
   wherein the first function is horizontal flipping and the second function is vertical flipping.

8. The method of claim 7, wherein scanning the one or more image blocks further comprises scanning image blocks in a column from bottom to top and scanning each row of a plurality of row from right to left, and wherein arranging the one or more image blocks further comprises arranging image blocks from each scanned row as rows on top of each other.

9. The method of claim 6, wherein the dual function image modification comprises:
   a first function; and
   a second function,
   wherein the first function is rotation and the second function is vertical flipping.

10. The method of claim 9, wherein scanning the one or more image blocks further comprises scanning the one or more of the image blocks in a column from bottom to top and scanning each column of a plurality of columns from right to left, and wherein arranging the one or more image blocks further comprises arranging image blocks from each scanned row as rows on top of each other.

11. The method of claim 6, wherein the dual function image modification comprises:
   a first function; and
   a second function,
   wherein the first function is rotation and the second function is horizontal flipping.

12. The method of claim 11, wherein scanning the one or more image blocks further comprises scanning the one or more of the image blocks in a column from top to bottom, scanning each column of a plurality of columns from left to right, and wherein arranging the one or more image blocks further comprises arranging image blocks from each scanned column as rows on top of each other.

13. A non-transitory computer-readable storage medium having an executable stored thereon, which when executed instructs a processor to:
   partition an image into a plurality of image blocks;
   identify one or more image blocks of the plurality of image blocks associated with a region of interest (ROI), including identifying a remaining portion of an image block and processing the remaining portion of the image block with image blocks in a next row;
   scan the one or more image blocks in an image modification order, wherein scanning image blocks includes scanning the one or more of the image blocks in a row from left to right and scanning each row of a plurality of rows from bottom to top;
   arrange the one or more image blocks according to the image modification order to form a modified image including the region of interest (ROI), wherein arranging the one or more image blocks includes arranging image blocks from each scanned row as rows on top of each other; and crop the region of interest (ROI) in the modified image to form a new image.

14. The non-transitory computer-readable storage medium of claim 13, wherein the image modification order is a single function image modification.

15. The non-transitory computer-readable storage medium of claim 14, wherein the image modification order further comprises a function, wherein the function is rotation.

16. The non-transitory computer readable storage medium of claim 15, wherein scanning the one or more image blocks further comprises scanning the one or more of the image blocks in a column from bottom to top and scanning each column of a plurality of columns from left to right, and wherein arranging the one or more image blocks further comprises arranging image blocks from each scanned column as rows on top of each other.

17. The non-transitory computer-readable storage medium of claim 14, wherein the image modification order further comprises a function, wherein the function is horizontal flipping.

18. The non-transitory computer-readable storage medium of claim 17, wherein scanning the one or more image blocks further comprises scanning the one or more of the image blocks in a row from right to left and scanning each row of a plurality of row from top to bottom, and wherein arranging the one or more image blocks further comprises arranging image blocks from each scanned row as rows on top of each other.

19. The non-transitory computer-readable storage medium of claim 14, wherein the single function image modification comprises a function, wherein the function is vertical flipping.

20. The non-transitory computer-readable storage medium of claim 13, wherein the image modification order further comprises a dual function image modification.

* * * * *